July 6, 1937.   V. S. LARIONOFF-ROMANOVSKY   2,086,189
CONVEYING AND POWER TRANSMITTING MECHANISM
Filed March 4, 1937   2 Sheets-Sheet 1
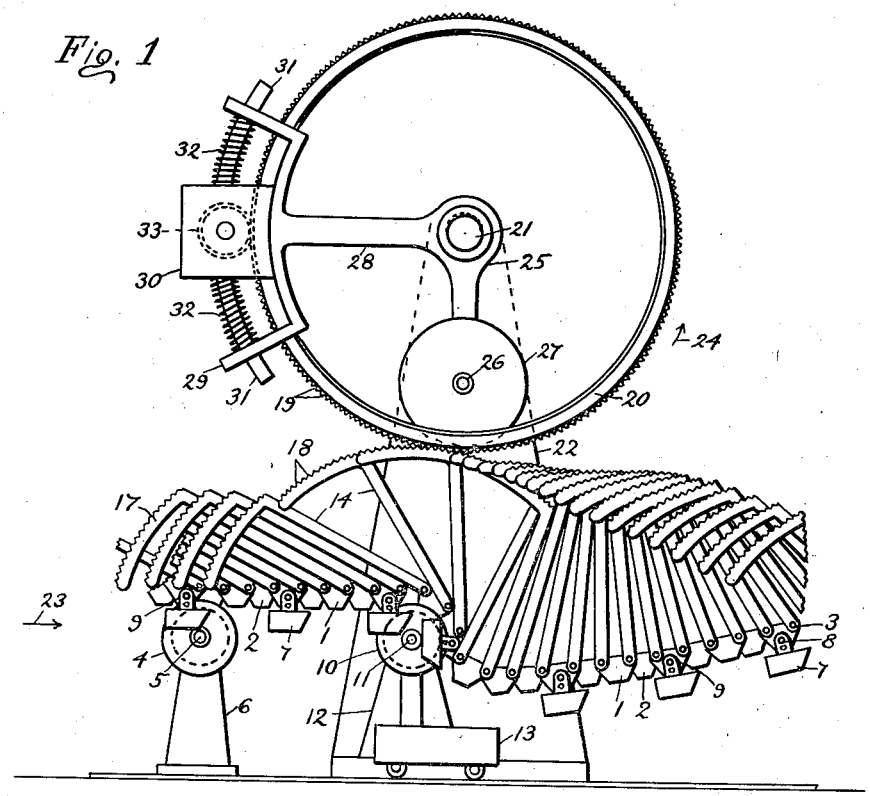
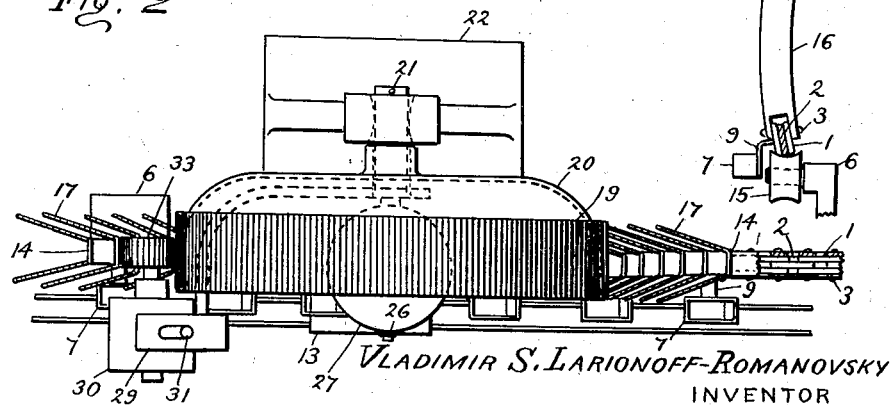
Vladimir S. Larionoff-Romanovsky
INVENTOR
BY John P. Nixonov
ATTORNEY July 6, 1937.  V. S. LARIONOFF-ROMANOVSKY  2,086,189
CONVEYING AND POWER TRANSMITTING MECHANISM
Filed March 4, 1937  2 Sheets-Sheet 2
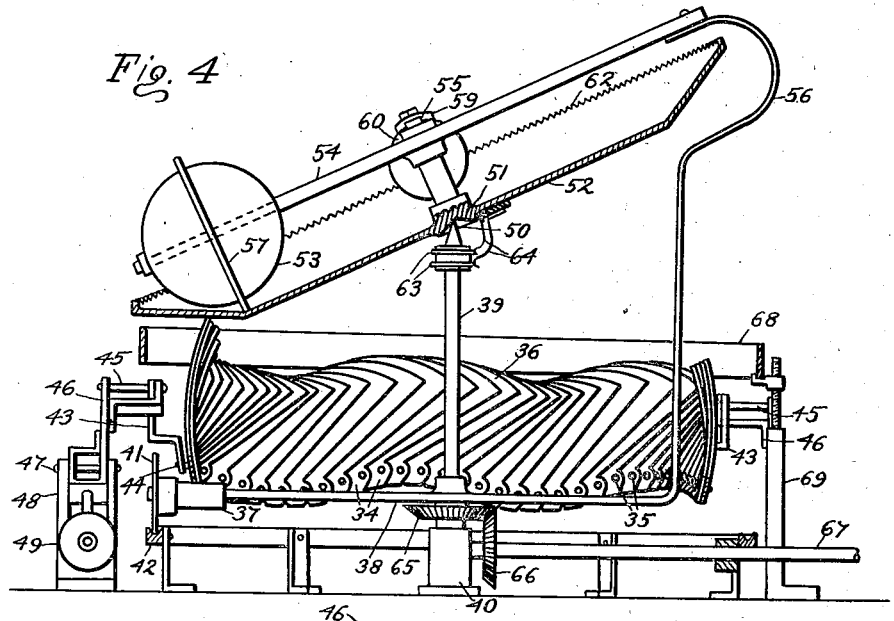
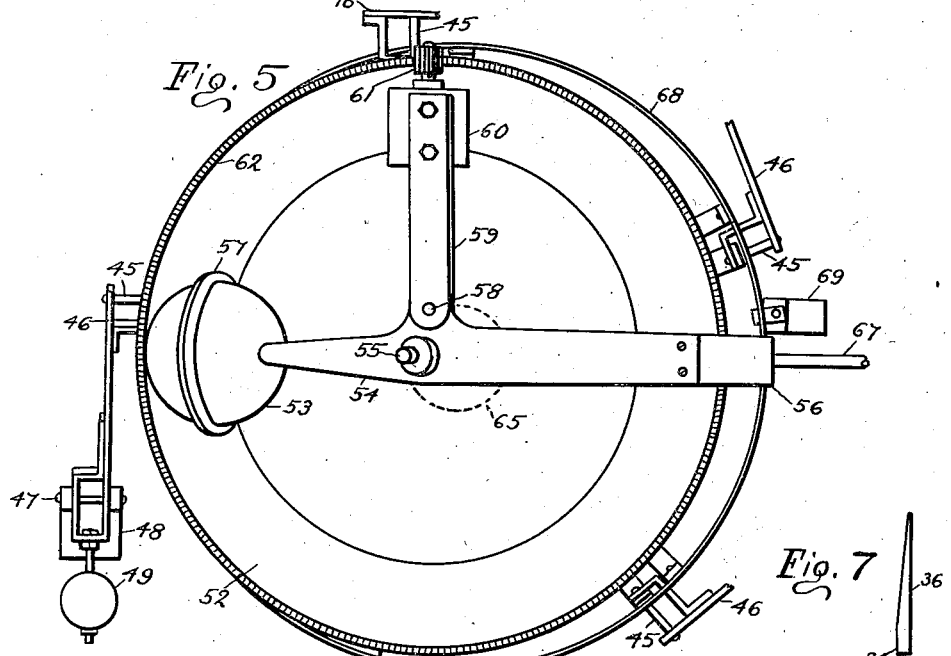
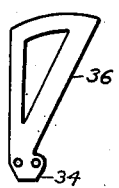
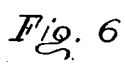
Vladimir S. Larionoff-Romanovsky
INVENTOR
BY John P. Nikonow
ATTORNEY Patented July 6, 1937

2,086,189

UNITED STATES PATENT OFFICE 2,086,189

CONVEYING AND POWER TRANSMITTING MECHANISM

Vladimir S. Larionoff-Romanovsky, Philadelphia, Pa.

Application March 4, 1937, Serial No. 128,954

12 Claims. (Cl. 198—141)

My invention relates to conveying and power transmitting mechanisms and has particular reference to mechanisms employing endless chains.

The object of my invention is to provide a mechanism which can be used for continuously conveying or transporting materials and objects. For this purpose I employ an endless chain movably supported on rollers or guides and provided with carrying buckets or containers, the chain being moved by an electric or other suitable motor through a special transmission.

Another object of my invention is to provide a conveyor with buckets on an endless chain, the buckets being moved to a loading point in a horizontal position for receiving materials or objects to be transported, a mechanism being also provided at an unloading or receiving point for turning the chain with the buckets at an angle so as to empty the buckets into other containers, such as railroad cars, or into storage piles. For this purpose I provide extension members pivotally or otherwise supported on the links of the chain, the outer portions of the extension members being curved so as to form a portion of a wheel or disc concentric with a roller over which the chain is guided at the unloading point, the members being pressed by a driving wheel so as to cause the chain to partly encircle the roller. The chain by this arrangement is turned at an angle sufficient to cause the buckets to spill their contents down into other receptacles.

Another object of my invention is to provide a mechanism for transmitting power by means of an endless chain wedged between a roller and a driving wheel, the chain being provided with extension sectors forming a transmitting disc at the point of contact with the wheel.

My invention is more fully described in the accompanying specification and drawings in which—

Fig. 1 is a fractional front elevational view of my mechanism as used for conveying materials.

Fig. 2 is a fractional top plan view of the same.

Fig. 3 is a detail view of the chain with an extension member on the link.

Fig. 4 is a sectional elevational view of a modified mechanism as applied to transmitting power.

Fig. 5 is a top plan view of the same.

Fig. 6 is a detail view of a modified chain link extension.

Fig. 7 is another view of the chain link extension.

My conveying and power transmitting mechanism consists of a chain formed of links 1 and 2 joined together by pivots 3. The end links are joined together so as to form an endless chain which is movably supported on rollers 4, rotatively mounted on shafts 5 extending from brackets 6. The rollers are placed so as to extend the chain along points where materials are stored and where they are deposited by the conveyor. The chain, for instance, may be made to extend along a water front for receiving bulk materials or freight from boats, this material or freight being unloaded in a warehouse or railroad tracks into cars. For conveying or transporting bulk materials or various objects, buckets 7 are attached to the links 1 by screws or rivets 8. The buckets or similar containers have lugs 9 in order to bring them beyond flanges of the rollers 4. An unloading roller 10 is supported on a shaft 11 on a bracket 12 at a point where the material or freight must be unloaded from the buckets into railroad cars 13 or into other suitable receptacles. Extension members 14 are supported by their lower ends on the pivots 3.

The guiding rollers 4 have flanges in order to prevent the chain from sliding off the roller on the curves. In many practical applications the chain may be formed in the shape of an elongated oval or even a rectangle with curved corners, in which case it will have straight portions as shown in Figs. 1 and 2. The roller 10 in such a case will have a cylindrical shape and the extensions 14 will be straight in vertical direction as shown in Fig. 2. If the chain is guided on a curve at the roller 10, then the latter must be preferably made curved as shown in Fig. 3, where it is denoted by the numeral 15, supporting the chain with curved extensions 16.

The upper portions 17 of the extensions 14 are curved to an approximately arcuate shape in such a manner that the arcs become concentric with the axis of the roller 10 when the chain moves over the latter. The links 1 and 2 are of a relatively narrow width at the bottom so as to be able to encircle the roller 10 if the latter is of a relatively small diameter. The arcs 17 have teeth 18 on the outside meshing with teeth 19 of a wheel 20. The latter is rotatively fitted on a shaft 21 loosely supported in a bracket 22. The wheel 20 rotates on the shaft 21 with a certain clearance so that it can exert pressure on the portions 17, pushing them down and thereby forcing the chain to partly encircle the roller 10 or to be partly wound on it as shown in Fig. 1. The extensions 14 rest against each other in an inclined position on straight portions of the chain as shown at the left in Fig. 1. On the curved portion of the chain, when it follows the curvature of the roller 10, the members 14 become raised, coming successively in contact with the wheel 20. The latter thereby, when rotated in direction of an arrow 24, causes the chain to move in direction of an arrow 23, causing it also to partly encircle the roller 10.

The bending of the chain over the roller 10 causes the buckets 7 to be turned at right angles, spilling the contents into the cars 13. With the construction shown in Figs. 1, 2 and 3, pressure from the wheel 20 is distributed evenly on the chain through the two arcuate portions 17 on each extension 14. These portions 17 expand outwardly so as to fit over each other or fold telescopically over the chain.

The shaft 21 also supports a rotary bracket 25 with an extension shaft 26 for a ball 27. The bracket fits over the shaft 21 with a clearance so as to allow the ball 27 to rest on the inner curved surface of the wheel 20. The ball by gravity takes the lowest position in the wheel, pressing the latter against the arcuate members 17 and rotating on its shaft 26 when the wheel is rotated. The bracket 25 has an arm 28 at the side extending horizontally and having a yoke 29 at the end for an electric motor 30. The latter has rods 31 curved concentrically with the wheel and sliding in the holes in the ends of the yoke 29, being retained in the middle by springs 32. The motor has a pinion 33 in mesh with the teeth 19 for turning the wheel 20. The springs permit the motor to adjust itself so as to place the ball 27 nearer to the point of contact between the teeth 19 and 18.

A modified construction is shown in Figs. 4, 5, 6 and 7. The chain in this case is formed of links 34 joined together by pivots 35 so that the links are aligned at an angle to the chain. The links have extensions 36 in the shape of arcuate offset sectors, the arcuate upper edges in this case also forming concentric arcs when the chain is partly rolled over the roller 37. The latter is rotatively mounted on the end of an arm 38 which in turn rotates on a central vertical shaft 39 held in a base 40. The end of the arm 38 has a wheel 41 rolling in a circular rail 42.

The chain is bent into a circular shape concentric with the shaft 39, and the links with their extensions are bent into arcuate shape so that the chain represents an equatorial belt of a sphere. It is flexibly supported at certain intervals on links 43 by long pivots 44. The upper ends of the links are pivoted on pins 45 on the ends of levers 46 rotatively supported on shafts 47 held in brackets 48. The outer ends of the levers 46 have counterweights 49 balancing the weight of the chain. The chain is longer than the circumference of the ring which it forms so that the links sag between the supporting links by the amount sufficient to permit the chain to be partly wound on the roller 37. The upper end of the shaft 39 has a sharp point 50 on which rests a cup-shaped bearing 51 of a wheel 52. The latter is held in an inclined position by a heavy ball 53 rotating on an arm 54 which in turn rotates by its middle portion on a shaft 55 extending from the center of the wheel. The other end of the arm 54 is connected with an extension 56 of the arm 38. The outer portion of the wheel is raised so as to lie horizontally against the curved portions of the link extensions 36 engaging them by friction. The ball has a ring 57 rolling on the wheel. The arm 54 has a pivot 58 supporting a bar 59 the other end of which supports an electric motor 60 with a pinion 61 engaging gear teeth 62 on the periphery of the wheel 52. Current is delivered to the motor through the shaft 39, collector rings 63 and flexible brushes 64. The motor in operation rises with the bar 59 until its weight balances its torque, causing the wheel 52 to rotate. The chain being stationary, the wheel turns around the shaft 39, bending the chain over the roller 37 thereby rotating the latter and causing also the arm 38 to rotate. The rotation is transmitted through gears 65 and 66 to a power shaft 67.

A ring 68 is adjustably supported on brackets 69 below the normal operating position of the wheel 52. The latter is placed on the ring when it is desired to relieve the chain from the pressure of the ball 53.

With my mechanism it is possible to obtain a very large gear reduction between the motor and the shaft 67 and the ratio can be easily changed by substituting different pinions 61 on the motor shaft.

It is understood that my mechanism can be further modified without departing from the spirit of my invention as set forth in the accompanying claims.

I claim as my invention:

1. A conveying and power transmitting mechanism comprising an endless chain, means to support the chain, a roller rotatively supported under the chain, the chain being adapted to partly encircle the roller, a wheel rotatively supported above the roller, means to rotate the wheel, and curved extensions on the chain links adapted to extend between the chain and the wheel when the chain is partly encircling the roller, the ends of the extensions being curved so as to form arcs concentric with the roller when the chain is partly encircling the roller, the wheel being adapted to transmit rotation to the roller through the extensions of the chain thereby causing relative movement between the chain and the axis of the roller.

2. A conveying and power transmitting mechanism comprising an endless chain, means to support the chain, a roller rotatively supported under the chain, the chain being adapted to partly encircle the roller, a wheel rotatively supported above the roller, means to rotate the wheel, curved extensions on the chain links adapted to extend between the chain and the wheel when the chain is partly wound on the roller, the end portions of the extensions being curved so as to form arcs concentric with the roller when the chain is partly wound on the roller, the wheel being adapted to transmit rotation to the roller through the extensions and the chain thereby producing relative movement between the chain and the axis of the roller, and means to press the wheel against the curved extensions.

3. A conveying and power transmitting mechanism comprising an endless chain, means to support the chain, a roller rotatively supported under the chain, the chain being adapted to partly encircle the roller, a wheel rotatively supported above the roller, means to rotate the wheel, curved extensions on the chain links adapted to extend between the wheel and the roller when the chain is partly encircling the roller, the end portions of the extensions being curved concentrically with the roller when the chain is encircling the roller, the wheel being adapted to transmit rotation to the roller through the extensions and the chain thereby producing relative movement between the roller and the chain, and a weight movably supported on the wheel and adapted to press the wheel against the extensions at the point of contact therebetween.

4. A conveying and power transmitting mechanism comprising an endless chain, means to support the chain, a roller rotatively supported under the chain, the chain being adapted to partly encircle the roller, a wheel rotatively supported above the roller, means to rotate the wheel, curved extensions on the chain links extending between the chain and the wheel and adapted to cause the chain to partly encircle the roller under pressure from the wheel, the wheel being adapted to transmit rotation to the roller through the chain with its extensions thereby producing relative movement between the chain and the axis of the roller, and a weight movably supported on the wheel and adapted to remain by gravity at the lowest point thereby pressing the wheel against the extensions of the chain links.

5. A conveying and power transmitting mechanism comprising an endless chain, means to support the chain, a roller rotatively supported under the chain, the chain being adapted to partly encircle the roller, a wheel rotatively supported above the roller, curved extensions on the chain links adapted to extend between the wheel and the roller when the chain is partly curved around the roller, the end portions of the extensions being curved so as to transmit rotary motion from the wheel to the roller thereby producing relative movement between the roller and the chain, a lever rotatively supported on the axis of the wheel, a heavy member rotatively supported on one arm of the lever and adapted to press by gravity on the wheel at its lowest point thereby causing the wheel to press against the chain and roller through the extensions, and an electric motor on the other arm of the lever adapted to rotate the wheel, the motor being adapted to be held at the side of the wheel by the weight of the heavy member.

6. A conveying and power transmitting mechanism comprising an endless chain, means to support the chain, a roller rotatively supported under the chain, the chain being adapted to partly encircle the roller, a wheel rotatively supported above the roller, means to rotate the wheel, and members extending from the links and telescopically engaging each other when the chain is in a substantially straightened position between its supports, the members being adapted to extend between the roller and the wheel, the outer portions of the members being curved so as to form rolling surfaces for the wheel, the wheel being adapted to transmit rotation to the roller through the members of the chain thereby forcing the chain to partly encircle the roller and causing relative movement between the chain and the axis of the roller.

7. A conveying and power transmitting mechanism comprising an endless chain, means to movably support the chain, a roller rotatively supported under the chain, the chain being adapted to partly encircle the roller, a wheel rotatively supported above the roller, members extending from the chain links and adapted to form a curved contact surface between the roller and the wheel, means to press the wheel against the members thereby causing the chain to partly encircle the roller, means to rotate the wheel thereby causing the roller to rotate and the chain to move, and containers supported at the side of the chain in a substantially horizontal position and adapted to become inclined to the horizon when the chain is partly turned around the roller.

8. A conveying and power transmitting mechanism comprising an endless chain, means to movably support the chain, a plurality of containers at the side of the chain rigidly connected to the links of the chain and adapted to remain in a horizontal position when the chain moves over the supporting means, a roller under the chain, a wheel adapted to engage the roller through the chain, means to rotate the wheel thereby moving the chain, and means to partly turn the chain around the roller thereby causing the container to take an angular position to the horizon.

9. A conveying and power transmitting mechanism comprising an endless chain consisting of links joined by pivots, the axes of the pivots being perpendicular to the plane of the chain, means to support the chain, a roller under the chain, a wheel rotatively supported above the roller, extension members on the chain adapted to be interposed between the roller and the wheel, means to press the wheel against the members thereby causing the chain to partly encircle the roller, and means to rotate the wheel thereby causing relative movement between the chain and the roller.

10. A conveying and power transmitting mechanism comprising an endless chain consisting of links with pivotal joints, the axes of the joints being approximately perpendicular to the plane of the chain, means to support the chain, a roller movably and rotatively supported under the chain, the chain being adapted to partly encircle the roller, a wheel rotatively and movably supported above the roller, extension members on the chain links adapted to extend between the roller and wheel, means to prevent longitudinal movement of the chain, and means to rotate the wheel thereby causing the roller to be rotated by the wheel through the chain and members and to be moved along the chain, the wheel being adapted to follow the roller.

11. A conveying and power transmitting mechanism comprising an endless circular chain having pivoted joints between its links in an approximately vertical alignment, the plane of the chain being approximately horizontal, means to support the chain, means to prevent substantial horizontal displacement of the chain, a vertical shaft in the center of the chain, an arm rotatively supported on the shaft and extending under the chain, a roller rotatively mounted on the arm under the chain, the chain being adapted to be partly wound on the roller, a second arm rotatively supported on the shaft, a wheel rotatively mounted on the second arm above the roller, extension members on the chain adapted to extend between the roller and the wheel, means to press the wheel against the extension members thereby causing the chain to be partly wound on the roller, and means to rotate the wheel thereby causing the roller to rotate on its axis and the arms to rotate on the shaft with the roller and wheel.

12. A conveying and power transmitting mechanism comprising an endless chain formed into a circle, the plane of the circle being substantially horizontal and perpendicular to the axes of the pivotal joints between the links of the chain, means to support the chain, means to prevent substantial horizontal displacements of the chain, a vertical shaft in the center of the circle, an arm rotatively supported on the shaft, a roller rotatively supported on the arm under the chain, the chain being adapted to partly encircle the roller, a wheel above the roller, means to rotatively support the wheel on the shaft, means to rotate the wheel thereby causing the wheel to roll on the chain, extension members on the chain links adapted to extend between the chain and the wheel thereby transmitting the rotation from the wheel to the roller, means to rotate the wheel, and a ball movably supported on the wheel and adapted to press the wheel against the chain link extensions.

VLADIMIR S. LARIONOFF-ROMANOVSKY.